Jan. 11, 1927.  
G. W. ENGSTROM  
PRESSURE REGULATOR  
Filed Dec. 24, 1921  2 Sheets-Sheet 1  
1,613,879

Inventor.  
Gustaf W. Engstrom,  
By H. P. Deuiale  
Atty.

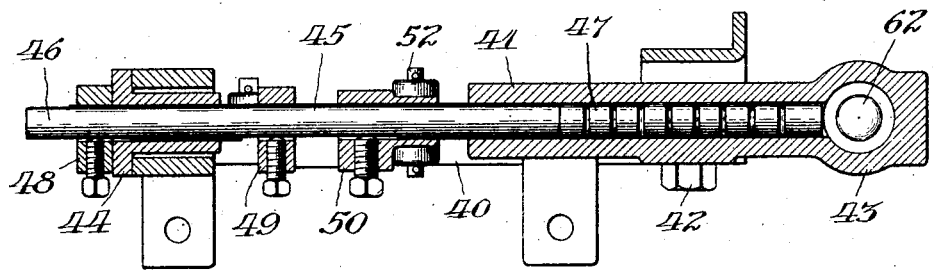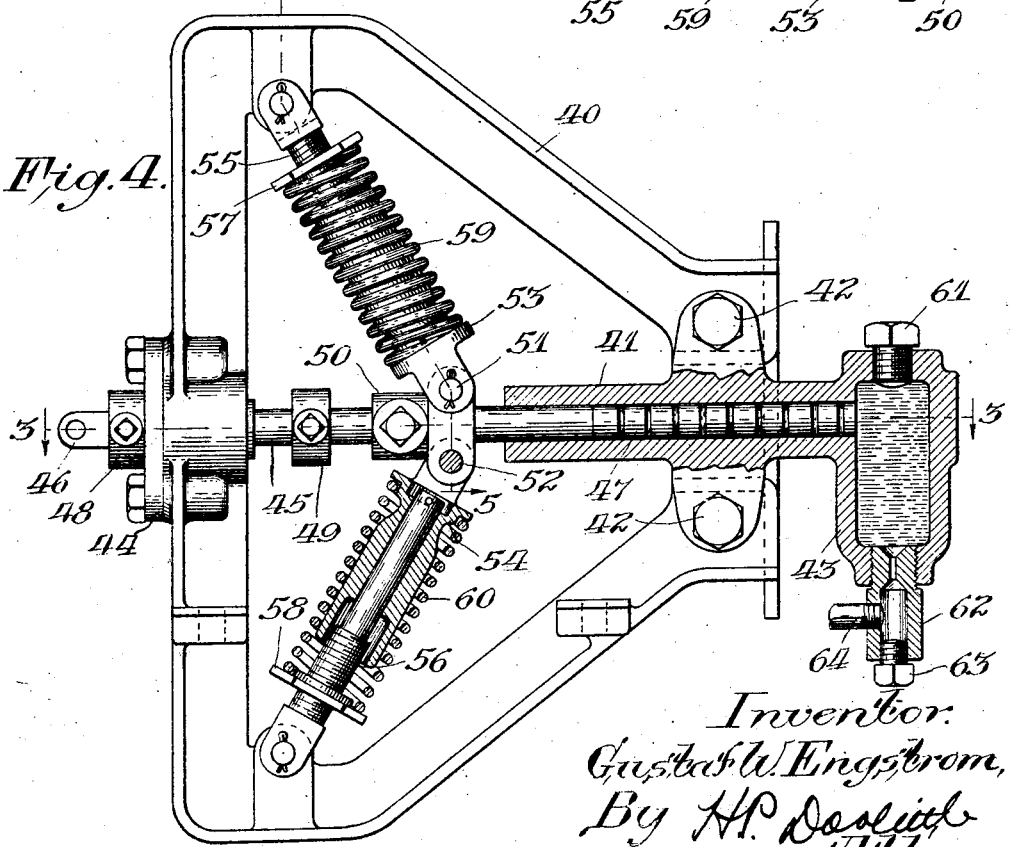

Patented Jan. 11, 1927.

1,613,879

UNITED STATES PATENT OFFICE.

GUSTAF W. ENGSTROM, OF RIVERSIDE, ILLINOIS, ASSIGNOR TO INTERNATIONAL HARVESTER COMPANY, OF CHICAGO, ILLINOIS, A CORPORATION OF NEW JERSEY.

PRESSURE REGULATOR.

Application filed December 24, 1921. Serial No. 524,568.

My invention relates to pressure regulators, and particularly to a device adapted to regulate the pressure in a flash or semi-flash boiler such as used on motor vehicles. Boilers of this class are usually provided with a pilot burner that burns continuously, and a main fuel burner which is automatically turned on or off as the boiler pressure falls below or rises above predetermined limits.

One of the objects of my invention is to provide a pressure regulator responsive to pressure conditions in a boiler to which it is connected for controlling the main fuel burner in response to variations in boiler pressure.

Another object of my invention is to provide means responsive to pressure conditions in a boiler for shutting off the main burner when the boiler pressure rises above a predetermined point, and to turn on the burner when the pressure falls below a predetermined point.

Another object is to provide a pressure regulator that can be readily adjusted so as to open and close at any desired point within a wide range of pressures.

Another very important object is to provide a pressure regulator that will be actuated in one direction when the boiler pressure reaches a predetermined limit, but will not be actuated in the opposite direction until another predetermined limit has been reached.

Still another object is to provide a pressure regulator in which a variable resistance acts on a movable member in opposition to the boiler pressure in such a manner that the movable member will be held in one extreme position by the variable resistance until the boiler pressure reaches a predetermined maximum sufficient to overcome the resistance and actuate the movable member, and that as the movable member is actuated the resistance decreases so that the member is not returned to initial position until the boiler pressure has dropped to a predetermined minimum.

With the above and other objects in view, which will be apparent as the specification proceeds, reference will now be had to the accompanying drawings for a description of my invention embodied in what I now believe to be its best form.

Fig. 3 is a section on the line 3—3 of Fig. 4 showing a modified form;

Fig. 4 is a side elevation, partly in section, of Fig. 3;

Fig. 5 is a section on the line 5—5 of Fig. 4.

Figure 1:
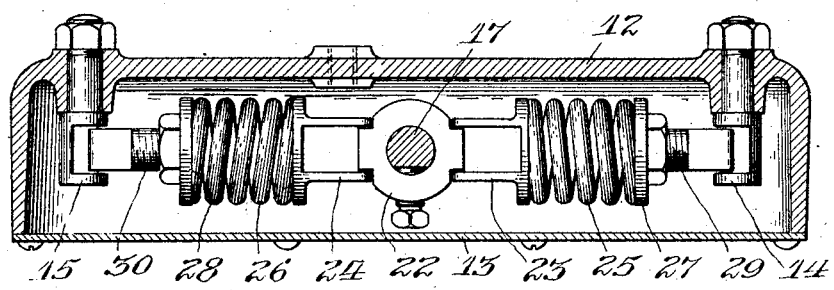
Figure 1 is a sectional view taken substantially on the line 1—1 of Fig. 2, showing a preferred form of the invention.

My pressure regulator has a hollow body 10 formed integral with a laterally projecting cylinder 11, one end of which is secured to a casing or hollow frame 12 in which the operative mechanism is housed. One wall 13 of the casing is removable to give access to the interior while the opposite wall supports two knife-edge bearings 14, 15 for a purpose to be described later. A piston 16 fits closely in the cylinder, one end extending into the housing where it engages a plunger 17 slidably mounted in a guide 18, the other end of the plunger having an eye 19 adapting it for connection to the main fuel burner valve or other mechanism to be controlled. The plunger has a flange 20 for limiting its movement in one direction, and an adjustable collar 21 to limit its movement in the opposite direction. Near the inner end of the plunger is a clamp 22 having two seats engaged by knife-edge bearings on the spring seats or heads 23, 24. Opposite the knife edge, each spring seat has a short extension or boss seating in one end of a coil spring 25, 26, the opposite end of the spring seating on an adjusting nut 27, 28 screwthreaded on the adjusting screws 29, 30, which have bearings on the the pivots 14, 15.

In operation the pressure regulator is mounted on the frame of the motor vehicle in any convenient manner, preferably by means of bolts passing through the lugs 31, 32. The plunger is connected to the main burner throttle valve, and the pipe 33 is connected to the boiler at one end, the other end being connected to the body by a bushing 34 having a drain plug 35 and a small orifice 36 communicating with the hollow body, which is filled with oil. A filling plug 37 provides a means for filling the body with oil, while a similar plug 38 in alignment with the cylinder 11 permits ready removal of the piston 16.

Figure 2:
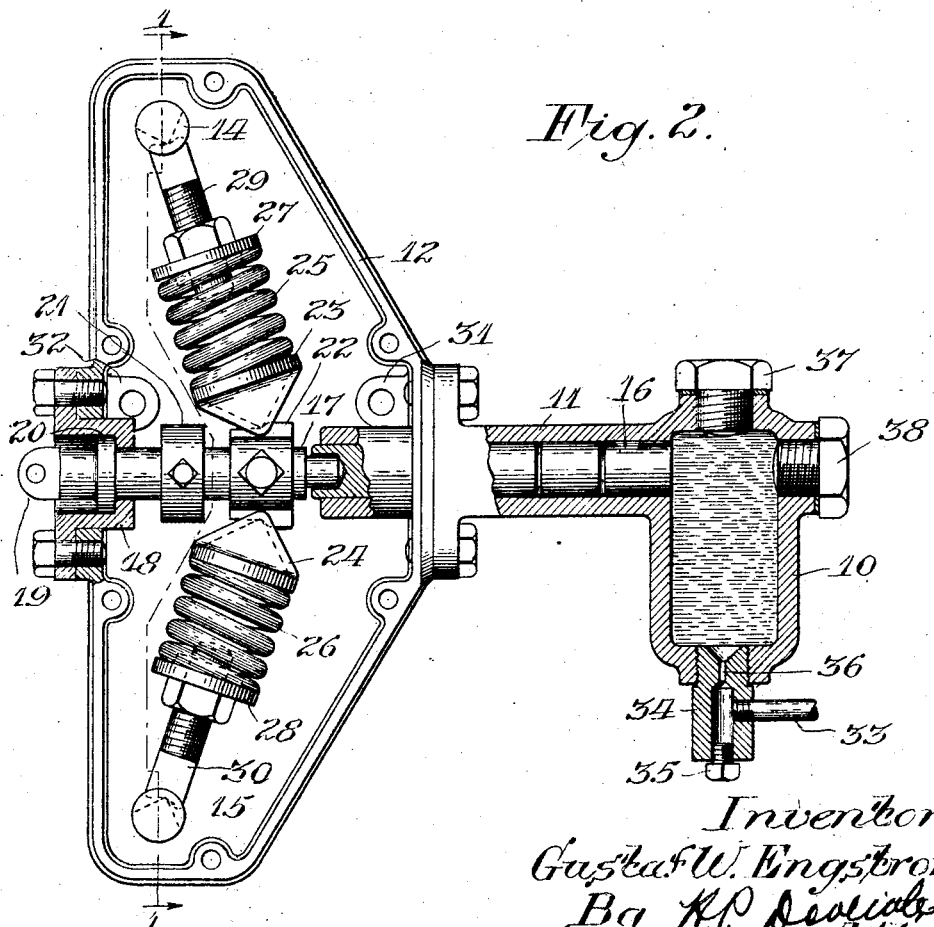
Fig. 2 is a side elevation, partly in section, of Fig. 1.

Normally, the parts occupy the position shown in Fig. 2 with the springs pressing the heads 23, 24 against the clamp 22, and holding the piston 16 in its innermost position. The nuts 27, 28 are adjusted so that the pressure of the springs resolved parallel to the axis of the piston will equal the maximum boiler pressure on the head of the piston. If now the boiler pressure is below the allowable maximum the parts will remain stationary and the main fuel burner fully open, but when the pressure reaches or exceeds this maximum, the pressure transmitted through pipe 33 and the oil in the body 10 will force the piston and plunger to the left against the tension of the springs and shut off the burner. When the plunger moves to the left the springs 25, 26 will be slightly compressed, but owing to their inclination the component of their pressure parallel to the axis of the piston will decrease so that the farther the piston moves to the left the smaller will be the absolute pressure required to retain it in that position. Consequently, when the boiler pressure becomes high enough to start the piston toward the left it will come to rest only when the stop 21 strikes the guide 18, and will not return until the pressure has dropped a considerable amount or to a predetermined minimum.

This construction has a decided advantage in that the movement of the piston is sudden and to the full extent of its stroke in both directions. By adjusting the nuts 27, 28 the load on the springs 25, 26 will be varied, and the pressures at which the piston moves correspondingly changed.

In the modification shown in Figures 3 to 5, a triangular frame 40 has a flanged cylinder 41 secured thereto by bolts 42, a hollow body 43 being formed integral with the cylinder. The frame is bored in alignment with the cylinder to receive a guide 44 for a plunger 45, one end of which is adapted at 46 for connection to the main burner valve and at the other end slides in the cylinder in contact with the piston 47. The plunger carries two adjustable stops 48, 49 for limiting its movement in opposite directions, and a clamp 50 having a pair of wings drilled to receive pivot pins 51, 52 for connection to spring seats or heads 53, 54. The spring seats are drilled to form guides for the reduced ends of the adjusting screws 55, 56 pivotally mounted on the main frame, and carrying adjusting nuts 57, 58 engaging one end of the springs 59, 60, the opposite ends of which bear on the seats 53, 54. The body 43 has a filling plug 61 on one side, and directly opposite is a bushing 62 having a drain plug 63 and connected to the pipe 64 leading to the boiler or other source of pressure.

The modification just described operates in the same manner as the preferred form of my invention, it differing only in details of construction.

While I have described my pressure regulator as particularly adapted for the control of boiler pressures, it is of course of much wider application and may be used for regulating pressures in many arts, and is capable of many modifications in form and mode of operation without departing from the spirit of my invention.

What I claim as new and desire to protect by Letters Patent is:

1. In a pressure regulator, the combination of a closed liquid containing casing connected to a source of pressure, a pressure responsive element exposed at one end to the liquid in the casing and movable thereby upon variation of pressure in the pressure source, and a control member directly connected to the pressure responsive element embodying means outside of said casing interposing a variable resistance to the pressure responsive element.

2. In a pressure regulator, the combination of a closed liquid containing casing connected to a source of pressure, a pressure responsive element exposed at one end to the liquid in the casing and movable thereby upon variation of pressure in the pressure source, and a control member directly connected to the pressure responsive element embodying means outside of the casing interposing a variable resistance to the pressure responsive element, the resistance decreasing with movement of the element in response to a higher pressure and increasing with movement of the element in response to a lower pressure.

3. In a pressure regulator, the combination of a closed liquid containing casing connected to a source of pressure, a pressure responsive element exposed at one end to the liquid in the casing and movable thereby upon variation of pressure in the pressure source, and a control member directly connected to and in line with the pressure responsive element embodying means outside of the casing interposing a variable resistance to the pressure responsive element, the resistance being a minimum when the pressure responsive element has moved to one extreme position in response to a maximum pressure and a maximum when the element has moved to its other extreme position in response to a minimum pressure.

4. In a pressure regulator, the combination of a closed liquid containing casing connected to a boiler, a pressure responsive element exposed at one end to the liquid in the casing and movable thereby upon variation in boiler pressure, a control member directly connected to and in line with the pressure responsive element, a varying resistance outside of said casing acting on the control member in opposition to the boiler pressure, and means whereby the resistance decreases as the member moves in opposition thereto and increases as the member moves in accord therewith.

5. In a pressure regulator, the combination of a closed liquid containing casing connected to a boiler, an elongated member exposed at one end to the liquid in the casing and movable thereby upon variation in boiler pressure, a plunger engaging the other end of the member and extending axially thereof, a variable resistance member outside of the casing and angularly disposed with respect to the plunger and pressing thereon in opposition to the boiler pressure on the movable member, and means at the outer end of the elongated member for connecting it to a member to be controlled.

6. In a pressure regulator, the combination of a cylinder, a piston freely slidable in the cylinder, a closed liquid containing casing communicating with a boiler, the piston being exposed to the liquid in the casing, a pair of angularly disposed yielding members on opposite sides of the piston and arranged outside of the casing, and means for transmitting the pressure of the yieldable members to the piston in opposition to the boiler pressure.

7. In a pressure regulator, the combination of a frame, a cylinder mounted thereon, means including a liquid containing casing for connecting the cylinder to a boiler, a piston in the cylinder exposed at one end to the liquid in the casing, a plunger slidable in the frame and engaging the piston, angularly disposed adjusting screws mounted on the frame, and springs carried by the adjusting screws and forcing the plunger toward the piston in opposition to the boiler pressure.

8. In a pressure regulator, the combination of a hollow liquid containing body having an integral cylindrical extension, the body being connected to a boiler, a frame on which the extension is mounted, a piston slidable in the extension and exposed to the liquid, a plunger engaging the piston, a pair of adjusting screws pivotally mounted on the frame on opposite sides of the plunger and inclined toward the piston, springs mounted on the adjusting screws, and means for transmitting the pressure of the springs to the plunger.

9. In a pressure regulator, the combination of a liquid containing hollow body having a cylinder and adapted for connection to a boiler, a frame on which the cylinder is mounted, a piston slidable in the cylinder and exposed to the liquid in the body, a plunger engaging the piston, a pair of adjusting screws pivotally mounted on the frame on opposite sides of the plunger and inclined toward the piston, springs mounted on the adjusting screws, means for transmitting the pressure of the springs to the plunger, and means for varying the tension of the springs.

10. In a pressure regulator, the combination of a cylinder in communication with a boiler through the medium of a fluid containing casing, a frame on which the cylinder is mounted, a piston slidable in the cylinder and exposed to the fluid in the casing, a pair of adjusting screws pivotally mounted on the frame on opposite sides of the piston and inclined toward the piston, springs mounted on the adjusting screws, and a plunger in axial alinement with the piston for transmitting the pressure of the springs to the piston.

11. In a pressure regulator, the combination of a frame having a plurality of bearings, a plunger slidable therein and having a plurality of bearings, adjusting screws engaging the bearings on the frame and inclined with respect to the plunger, heads engaging the bearings on the plunger, springs on the adjusting screws engaging the heads, and means acted on by the boiler pressure in opposition to the pressure of the springs.

12. A pressure controlled regulator comprising a pair of casings, a cylinder connecting the casings, one of said casings containing a liquid and connected to a source of pressure, a piston slidable in the cylinder and exposed to the liquid in said casing, and valve controlling means including a plunger in axial alinement with the piston and housed in the other casing and actuable by the fluid medium and piston upon increase of pressure in the pressure source.

13. A pressure controlled regulator comprising a pair of casings, a cylinder connecting the casings, one of said casings containing a liquid and connected to a source of pressure, a movable member slidable in the cylinder and the other casing and exposed to the liquid in the liquid containing casing, yieldable members in said other casing, said movable member comprising a valve controlling means actuable by change of pressure in the pressure source communicated through the liquid in the liquid containing casing and against the resistance of the yieldable members.

14. A pressure controlled regulator comprising a pair of casings, a cylinder connecting the casings, one of said casings containing a liquid and connected to a source of pressure, a movable member slidable in the cylinder and the other casing and exposed at one end to the liquid in the liquid containing casing, said movable member comprising a valve controlling means at its other end, a variable resistance in the other casing acting on the movable member intermediately of its ends, and means whereby the resistance decreases as the movable member moves in opposition thereto and increases as the member moves in accord therewith, the movement of the member being responsive to pressure changes in the pressure source communicated through the liquid in the liquid containing casing.

15. A pressure controlled regulator comprising a pair of casings, a cylinder connecting the casings, one of said casings containing a liquid and connected to a source of pressure, a movable member slidable in the cylinder and other casing and exposed at one end to the liquid in the liquid containing casing, said movable member comprising a valve controlling means at its other end, a pair of angularly disposed yieldable members on opposite sides of the movable member intermediately of the ends thereof, and means for transmitting the force exerted by the yieldable members to the movable member in opposition to the pressure exerted by the pressure source communicated through the liquid in the liquid containing casing.

In testimony whereof I affix my signature.

GUSTAF W. ENGSTROM.